(12) United States Patent
Suginaka (10) Patent No.: US 10,380,336 B2
(45) Date of Patent: Aug. 13, 2019

(54) INFORMATION-PROCESSING DEVICE, INFORMATION-PROCESSING METHOD, AND RECORDING MEDIUM THAT BLOCK INTRUSION OF MALICIOUS PROGRAM TO KERNEL

(71) Applicant: Junko Suginaka, Tokyo (JP)

(72) Inventor: Junko Suginaka, Tokyo (JP)

( * ) Notice: Subject to any disclaimer, the term of this patent is extended or adjusted under 35 U.S.C. 154(b) by 351 days.

(21) Appl. No.: 15/306,823

(22) PCT Filed: May 15, 2015

(86) PCT No.: PCT/JP2015/063975
§ 371 (c)(1),
(2) Date: Oct. 26, 2016

(87) PCT Pub. No.: WO2015/174512
PCT Pub. Date: Nov. 19, 2015

(65) Prior Publication Data
US 2017/0220795 A1 Aug. 3, 2017

(30) Foreign Application Priority Data
May 16, 2014 (JP) .................... 2014-102114

(51) Int. Cl.
*G06F 21/52* (2013.01)
*G06F 11/30* (2006.01)
(Continued)

(52) U.S. Cl.
CPC .............. *G06F 21/52* (2013.01); *G06F 9/445* (2013.01); *G06F 11/30* (2013.01); *G06F 21/56* (2013.01);
(Continued)

(58) Field of Classification Search
CPC ...... G06F 21/53; G06F 9/45533; G06F 21/52; H04L 63/105
(Continued)

(56) References Cited

U.S. PATENT DOCUMENTS

| 7,996,836 B1 | 8/2011 | McCorkendale |
| 2010/0031360 A1 | 2/2010 | Seshadri |

(Continued)

FOREIGN PATENT DOCUMENTS

| JP | 2003-108253 A | 4/2003 |
| JP | 2007-140798 A | 6/2007 |
| JP | 2013-101550 A | 5/2013 |

OTHER PUBLICATIONS

Extended European Search Report dated Sep. 29, 2017 in corresponding European Patent Application No. 15792925.8, consisting of 6 pp.

(Continued)

*Primary Examiner* — Bryan F Wright
(74) *Attorney, Agent, or Firm* — Volpe and Koenig, P.C.

(57) ABSTRACT

An information processing device (1) includes: a Syscall instruction monitoring part (313) configured to monitor at least an instruction to pass processing to a kernel (35) of an OS among instructions issued to a CPU (11); and an exclusive loader (201) configured to load a monitoring software (31) functioning as the Syscall instruction monitoring part (313) at region A in a RAM (30), the monitoring software set at ring 0 that is higher than ring (2) set for the kernel (35) of the OS. Even when an access is tried to a resource by executing a malicious program, the access can be detected and intrusion of the malicious program to the kernel can be blocked.

7 Claims, 8 Drawing Sheets (51) Int. Cl.
  *G06F 9/445* (2018.01)
  *G06F 21/56* (2013.01)
  *H04L 29/06* (2006.01)
(52) U.S. Cl.
  CPC ...... *G06F 2221/033* (2013.01); *H04L 63/105* (2013.01)
(58) Field of Classification Search
  USPC .......................................................... 726/23
  See application file for complete search history.

(56) References Cited

U.S. PATENT DOCUMENTS

| | | | | |
|---|---|---|---|---|
| 2010/0299665 | A1* | 11/2010 | Adams | G06F 9/45533 718/1 |
| 2012/0137375 | A1* | 5/2012 | Ramachandran | G06F 21/6218 726/28 |
| 2012/0255004 | A1* | 10/2012 | Sallam | G06F 21/52 726/23 |
| 2012/0255016 | A1 | 10/2012 | Sallam | |
| 2014/0281437 | A1* | 9/2014 | Patel | G06F 9/30145 712/228 |
| 2015/0013008 | A1* | 1/2015 | Lukacs | G06F 21/53 726/24 |
| 2015/0101049 | A1* | 4/2015 | Lukacs | G06F 21/566 726/23 |
| 2015/0121135 | A1* | 4/2015 | Pape | G06F 11/1484 714/15 |

OTHER PUBLICATIONS

International Search Report mailed in corresponding International Pat. Appln No. PCT/JP2015/063975 dated Aug. 18, 2015, consisting of 5 pp. (English Translation Provided).

Written Opinion mailed in corresponding International Pat. Appln. No. PCT/JP2015/063975 dated Aug. 18, 2015, consisting of 4 pp.

Tatsuya Takehisa et al., "Application of Exception Handling Attack against AES-NI to Malware Analysis", 2014 Nen Symposium on Cryptography and Information Security Gaiyoshu, The Institute of Electronics, Information and Communication Engineers, Jan. 24, 2014 (Jan. 24, 2014), pp. 1-8.

Koichi Onoue et al., "VMM-based Architecture for Protecting Application Data", Symposium on Advanced Computing Systems and Infrastructures SACSIS2009 Ronbunshu, vol. 2009, No. 5, Information Processing Society of Japan, May 21, 2009 (May 21, 2009), pp. 189-197.

Takuya Yoshimura et al., "System call hook method for analyzing behavior of malware by virtual machine monitor", Dai 72 Kai (Heisei 22 Nen) Zenkoku Taikai Koen Ronbunshu (3) Network Security, Information Processing Society Japan, Mar. 8, 2010 (Mar. 8, 2010), pp. 3-609-3-610.

Shinetsu Izawa, "Kasoka no Standard wa Cloud e Keiryo Secure na Hypervisor Xen", ASCII. technologies, Mar. 24, 2010 (Mar. 24, 2010), vol. 15, No. 5, pp. 48-57.

* cited by examiner

INFORMATION-PROCESSING DEVICE, INFORMATION-PROCESSING METHOD, AND RECORDING MEDIUM THAT BLOCK INTRUSION OF MALICIOUS PROGRAM TO KERNEL

TECHNICAL FIELD

The present invention relates to a technique of monitoring an information processing operation executed by a processor.

BACKGROUND ART

Malicious programs have been recently developed to perform unauthorized and harmful operations to a computer, and such malicious programs greatly degrade the security of a computer by replacing a file of the computer or changing the configuration of the system, for example. Such malicious programs behave as follows. They firstly intrude into a memory of the computer from the outside, and piggyback on an access to a resource in the kernel space from a user mode when an application program (AP) is executed. Then they acquire the privilege level (ring 0), and govern the resource control. In this way, unauthorized actions by such programs become executable as the programs intend. Currently various types of software to monitor the execution of malicious programs and control their unauthorized activities are proposed.

Patent Literature 1 describes a method for monitoring applications to prevent the leakage of resource information. The method is to limit the access by an API, and includes: detecting the starting of an application; suspending a processing request for the resource issued from the started application; authenticating whether the started application is a legitimate application or not; and only when the started application succeeds in the authentication, permitting the processing based on the suspended processing request.

Patent Literature 2 describes an information-leakage prevention system for computer. The system is configured to, when an application to be executed on the computer accesses information stored in a memory such as a hard disk HDD, hook the application using the hook function of the operating system (OS). A determination unit of the system determines whether the access meets a preset access admission condition, and when it is determined as an unauthorized access by virus or the like, the system disables the passing of information stored in the memory to the application.

Patent Literature 3 describes an external boot technique of attaching an external device that stores an exclusive loader and an administrative file beforehand to a computer, and then turning the power of the computer on. This technique is to allow the administrative file to control the regions in which the OS is loaded from the HDD using the exclusive loader that is loaded into a main memory (RAM) from the external device, and give a difference in privilege level among the regions. Thereby, a secure region can be kept by the administrative file at a predetermined region of the RAM.

CITATION LIST

Patent Literature

Patent Literature 1: Japanese Patent Application Laid-Open No. 2003-108253
Patent Literature 2: Japanese Patent Application Laid-Open No. 2007-140798
Patent Literature 3: Japanese Patent Application Laid-Open No. 2013-101550

SUMMARY OF INVENTION

Technical Problem

According to the application monitoring method to prevent the leakage of resource information described in Patent Literature 1, a filter module for hooking and an authentication module are configured in the same process space as that of the application, and therefore both of the hook operation and the authentication operation by these modules have a serious problem in reliability. Further the method is configured to authenticate an application by collating the hash between the hooked application and an application registered beforehand, and if this authentication fails, force the application to quit or inform the administrator of the failure. Therefore the operation of the computer may stop.

The information-leakage prevention system described in Patent Literature 2 is targeted to the function relating to the input/output of a file system, and the system is configured to use predetermined check items, such as an IO type representative of the operation including writing of file data, an application name, a data file name, execution constraints of a program to be executed (date and time, the range or the like), which are input via a user interface of the computer, as the access admission condition, and thereby allowing the file system itself to have the monitoring function and the determination function by user's setting. This system therefore has a limit in performing appropriate monitoring of the general process for an access from a user space to a resource in the kernel space that does not relate to the reading of file data.

The technique described in Patent Literature 3 requires an external device, and is configured to disable an unauthorized access from the OS and keep the secure region in the main memory configured during the starting of the computer after the starting as well. This technique is not configured to monitor an access instruction to the kernel to request the processing of a resource.

In view of the above, the present invention provides an information-processing device capable of monitoring an instruction to the kernel of the OS to request the processing of a resource, and such information-processing monitoring method, program, and recording medium.

Solution to Problem

An information processing device according to the present invention, includes: a monitoring unit configured to monitor at least an instruction to pass processing to a kernel of an OS among instructions issued to a processor; and a load unit configured to load a monitoring software functioning as the monitoring unit at a predetermined region of a main memory, the monitoring software having a privilege level set higher than a privilege level of the kernel of the OS.

A method for monitoring information processing according to the present invention includes: monitoring at least an instruction to pass processing to a kernel of an OS among instructions issued to a processor; and loading a monitoring software functioning as the monitoring step at a predetermined region of a main memory, the monitoring software having a privilege level set higher than a privilege level of the kernel of the OS.

A program according to the present invention is to make a processor function as: a monitoring unit configured to monitor at least an instruction to pass processing to a kernel of an OS among instructions issued to the processor; and a load unit configured to load a monitoring software functioning as the monitoring unit at a predetermined region of a main memory, the monitoring software having a privilege level set higher than a privilege level of the kernel of the OS.

A computer readable recording medium according to the present invention records a program to make a processor function as: a monitoring unit configured to monitor at least an instruction to pass processing to a kernel of an OS among instructions issued to the processor; and a load unit configured to load a monitoring software functioning as the monitoring unit at a predetermined region of a main memory, the monitoring software having a privilege level set higher than a privilege level of the kernel of the OS.

According to these aspects of the present invention, since the monitoring software has a privilege level set higher than the privilege level (ring) of the kernel of the OS, at least the issuance of the instruction to pass processing to the kernel of the OS among instructions issued to the processor can be always monitored so as to hook the issuance. Therefore, even when such an instruction contains an invalid program and an access is tried to a resource by executing such a malicious program, the access can be detected and intrusion of the malicious program to the kernel can be blocked.

Advantageous Effects of Invention

According to the present invention, an access to a resource based on a malicious program being executed can be detected, and intrusion by the malicious program to the kernel can be blocked.

DESCRIPTION OF EMBODIMENTS

Figure 1:
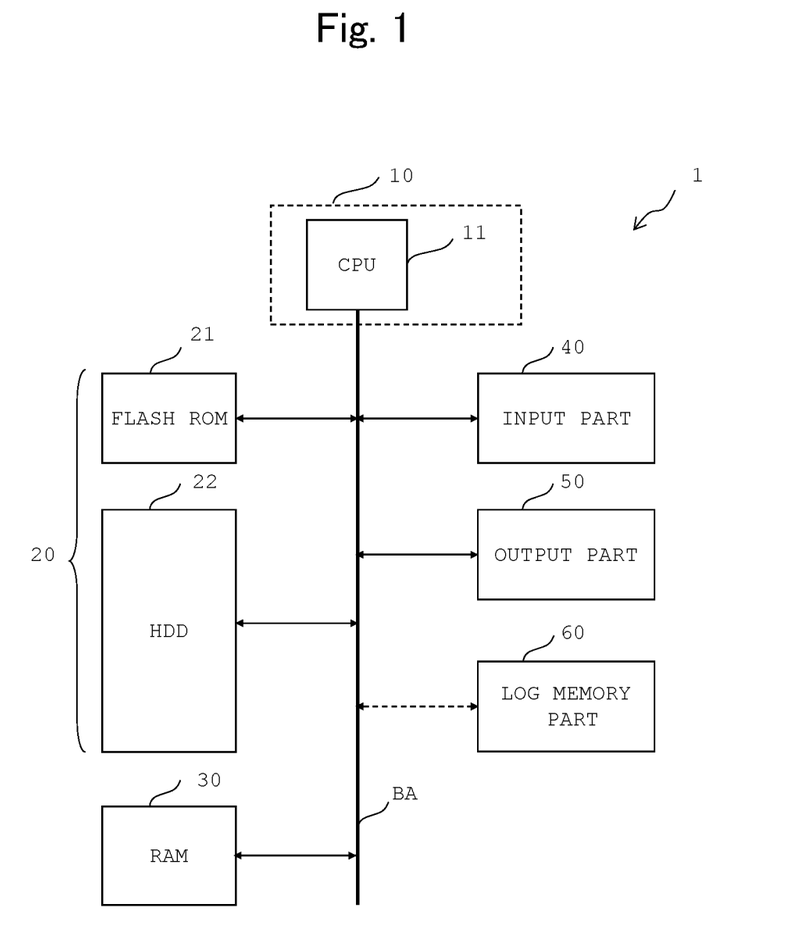
FIG. 1 shows the configuration of an information processing device as one embodiment of the present invention.

FIG. 1 shows the configuration of an information processing device as one embodiment of the present invention. The information processing device 1 to which the present invention is applicable includes a server having a built-in computer, a general-purpose personal computer, a portable information processing terminal, and various types of information processing devices having a communication function via a network.

The information processing device 1 is made up of a microcomputer, and includes a chip set 10 including a CPU (Central Processing Unit) 11 as the processor. The CPU 10 is connected to, via a bus BA, an auxiliary memory 20 including a flash ROM (Read Only Memory) 21 and a hard disk drive (HDD) 22, a RAM (Random Access Memory) 30 as a main memory, an input part 40, an output part 50 and a log memory part 60 that is provided as needed.

Figure 2:
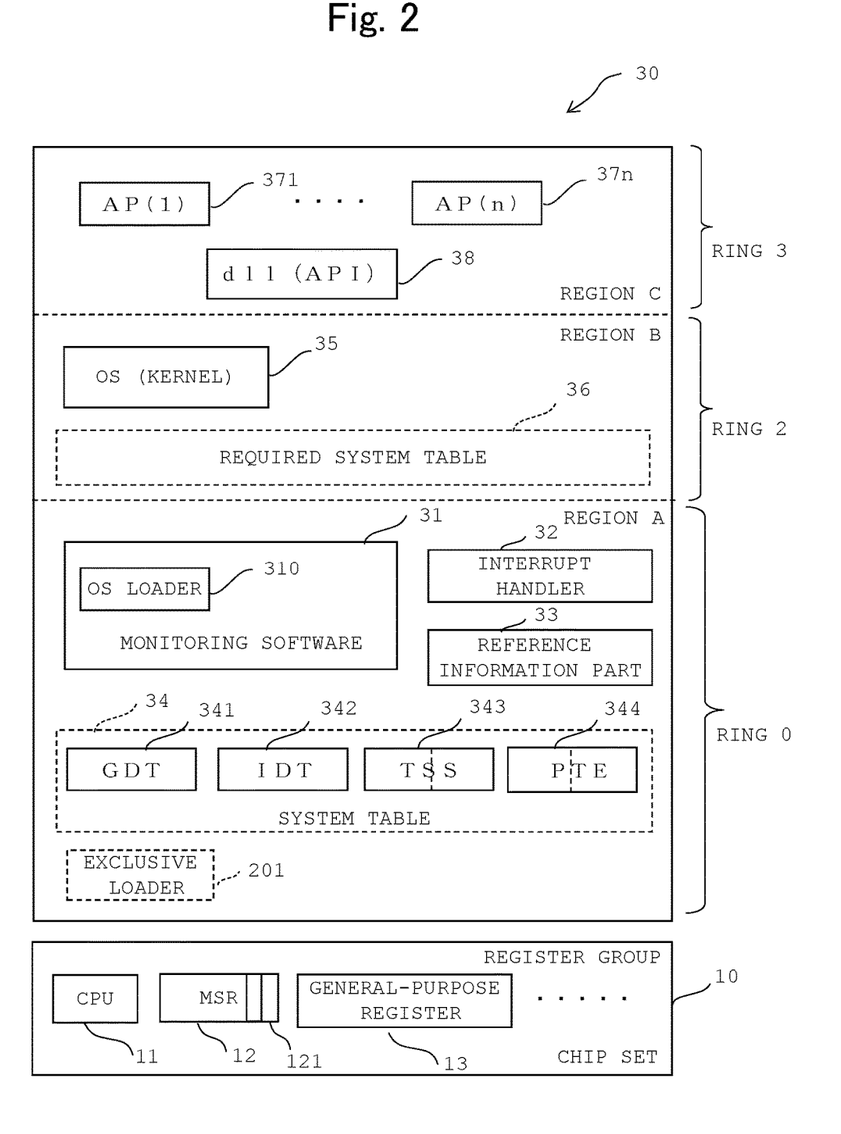
FIG. 2 shows one example of a program map of a main memory of the information processing device after starting.

The flash ROM 21 stores BIOS (Basic Input/Output system). The HDD 22 stores an OS (Operation System) as well as various types of application programs and information on necessary data. The information stored in the HDD 22 is read (loaded) to the RAM 30 mainly during the starting as shown in FIG. 2. The details are described referring to FIG. 2.

Figure 4:
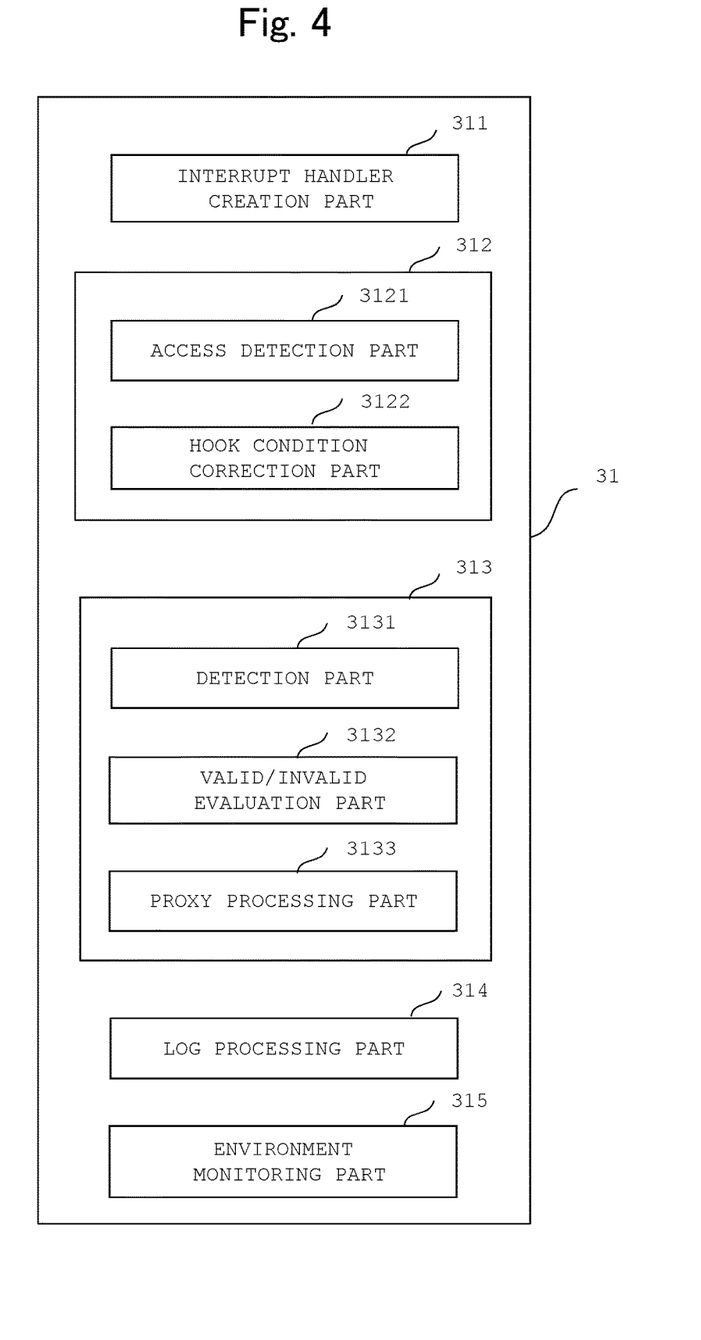
FIG. 4 is a functional block diagram showing one example of the monitoring software.

The RAM 30 functions as the main memory. When the information processing device 1 is started, programs or the like stored in the auxiliary memory 20 are loaded on the RAM 30, and information being processed also is stored in the RAM 30 temporarily. The information processing device 1 functions as a process execution part according to the present invention as shown in FIG. 4 as well as a part performing various types of well-known information processing by loading the programs or the like stored in the auxiliary memory 20 to the RAM 30, and executing the programs or the like by the CPU 11.

The input part 40 includes a keyboard including a numeric keypad, a mouse, a touch panel and the like, and is configured to input necessary information and issue an instruction for processing. The output part 50 may be a display part on which images are displayed. The output part 50 may be a printer part or a communication part, for example, and the communication part may be configured to exchange information by connecting to a network such as the internet. The output part 50 may include such a printer part and a communication part together with the display part. As described later, the log memory part 60 is configured to record the history (programs) of accesses by privilege instructions (e.g., Syscall, Sysenter, call gate) that are processing requests for a resource, which occur during the operation of the information processing device 1, and record the log of processing based on such instructions chronologically.

FIG. 2 shows one example of a program map of the RAM 30 of the information processing device 1 after starting, together with the chip set 10 including the CPU 11.

The chip set 10 includes the CPU 11 as the processor and includes flag registers representative of the current status of the CPU 11, a MSR (Model Specific Register) 12 and a general-purpose register 13 for data storage as well as a group of registers including index registers relating to addressing of a memory, special registers, and segment registers relating to a memory management method. The MSR 12 includes a register 121 therein, and the register 121 is a predetermined register to generate an invalid opcode exception (hooking) in response to the issuance of a Syscall instruction. When this register 121 is set at the hook condition as Disable (=0), the issuance of the Syscall instruction is hooked as an invalid opcode fault.

Figure 3:
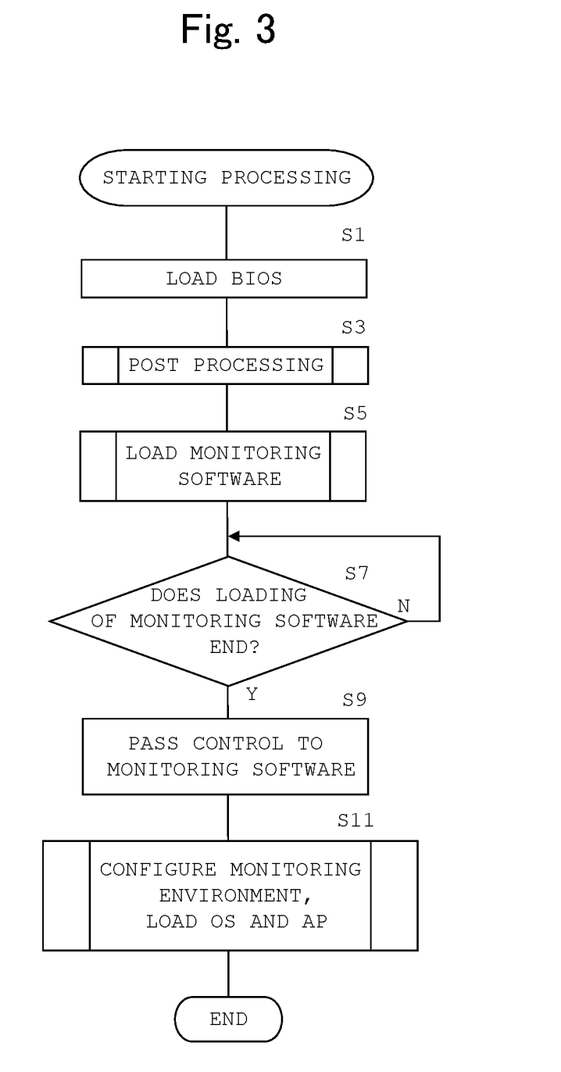
FIG. 3 is a flowchart showing one example of the starting processing.

FIG. 3 is a flowchart showing one example of the starting processing. The following explains the program map of the RAM 30 shown in FIG. 2, and then explains the flowchart of the starting processing shown in FIG. 3.

The RAM 30 has segmented regions including regions A, B and C. Region A has a value 0 (so-called ring 0) set as a DPL (Description Privilege Level) that is a privilege level. Region B is set at ring 2 and Region C is set at ring 3. Since Region A is set at ring 0, a monitoring software 31 can be loaded in this region at the highest privilege level, for example, and all of the information configured in this region A can be loaded at ring 0. DPL (ring) is to describe privilege levels in the memory space as is well known, and there are four ranks including DPL "0" to DPL "3" (ring 0 to ring 3). As the value of DPL is relatively smaller, this means a higher privilege level. For instance, when a program runs in the space having a DPL value described as a relatively large value, such a program is not allowed to access another space having a DPL value described with a smaller value. That is, in such a case, a general protection fault (#GP) described later is issued as the privilege level fault, and such an access is disabled. On the contrary, when a program runs in the space having a DPL value described as a relatively small value, such a program is allowed to access or browse in another space having a DPL value described with a larger value. A determination is enabled beforehand in this way as to whether an access is appropriate or not.

Region A includes a monitoring software 31 loaded from the HDD 22, a system table 34 and an interrupt handler 32 that are created by the monitoring software 31, and a reference information part 33 loaded from the HDD 22 described later. Since the reference information part 33 is used when the monitoring software 31 is executed as described later, this part functions integrally with the monitoring software 31.

The system table 34 includes a GDT (Global Descriptor Table) 341 to let the monitoring software 31 run, an IDT (Interrupt Descriptor Table) 342, a TSS (Task State Segment) 343, a PTE (Page Table Entry) 344 to convert a linear address from the GDT 341 into a physical address, and the like.

The GDT 341 is a table representative of the storage location of information as is well known. Specifically, the GDT 341 is a list of segment descriptors to manage the location to store information in the units of 8 bytes, for example. Each segment descriptor has four attributes. The attributes include "types" of information (program code, data, stack), "base address", "limit" and "DPL. The "base address" indicates a storage reference (start) address of the information in the RAM 30. The "limit" indicates the access range of the information. The DPL indicates the privilege level as described above. A segment descriptor to be used for addressing is selected through information of a segment selector that is used during conversion from a linear address. A determination as to whether an access of a task is permitted or not is made in response to an access request, by collating a CPL (Current Privilege Level) and a RPL (Requested Privilege Level) written at any one of the registers CS, DS, SS of the register group in the chip set 10 with the corresponding segment descriptor in the GDT 341.

The IDT 342 is a table indicating the storage location of the interrupt handler 32 in the monitoring software 31, which is executed in response to a general protection fault (#GP) as an exception interrupt.

The TSS 343 is created so as to correspond to each of the programs (tasks) in the monitoring software 31. That is, the TSS 343 is configured to transfer the execution status to a required program using a task switch so as to run the program suitable for the operation status, and give the processing by a program immediately before the transferring to the individual TSSs as context, so as to enable the returning to the original state.

The PTE 344 is to convert a linear address created at the GDT 341 to a physical address, and corresponds to each piece of information (each program code, each data, and each stack). Specifically the PTE 344 has pages, and each page has a predetermined data amount divided, e.g., 4 KB. Each page data has a physical address and an access attribute set therefor. Each page data includes types of a program code, data, and a stack. The physical address is to move the linear address to a predetermined position in the RAM 30. The access attribute corresponds to a privilege level, and it includes a "supervisor" and a "user. The "supervisor" refers to the processing in the kernel space (kernel mode), which corresponds to ring 0 to ring 2, and the "user" corresponds to ring 3. An exclusive loader 201 is indicated with dashed lines in the drawing, which is a program to load the monitoring software 31.

Region B includes a kernel 35 as the OS and a system table 36 that the kernel 35 creates to describe its own behavior.

Region C includes AP(1) 371 to AP(n) 37n that are various types of application programs running under the environment of the kernel 35. Region C includes a dynamic link library dll (API) 38 that is a dynamic list of API (Application Programming Interface) as a function to execute an access from the AP(1) 371 to AP(n) 37n to the OS (kernel) 35. The API structure created at the dll (API) 38 and issued to the kernel 35 at the privilege level 0 at the time of a processing request to a resource is called a Syscall instruction. Herein the API refers to the specifications on the procedure to call various functions (software) or the data format that a plurality of programs can share. The dll (API) refers to a shared library, in which APIs implemented as a module are combined in their programs by the dynamic link during the execution.

In FIG. 3, the power of the device is turned on. Then, BIOS (program) is firstly loaded from the flash ROM 21 to the RAM 30 (Step S1). Next, the BIOS is activated to execute POST (Power On Self Test) processing to initialize available peripherals (Step S3).

Next, the monitoring software 31 is loaded (Step S5). The monitoring software 31 can be loaded by the following procedure, for example. The BIOS loads MBR (Master Boot Record) from the leading sector of the HDD 22 to the RAM 30. Next, the control of the CPU 11 is passed to the MBR, and the exclusive loader 201 (see FIG. 2) that is stored beforehand in an active partition table in the HDD 22 is loaded to the RAM 30. Next, the exclusive loader 201 creates a temporary GDT, and this GDT sets the privilege level of region A at ring 0. In this state, the monitoring software 31 is loaded to region A.

When the monitoring software 31 is loaded (Yes at Step S7), the control of the CPU 11 is passed to the monitoring software 31 (Step S9). Next, the monitoring software 31 configures monitoring environment, i.e., the monitoring software 31 creates the system table 34 and the interrupt handler 32. Next, an OS loader 310 (see FIG. 2) is activated, and region B is designated and ring 2 is set therefor as the privilege level. Then, the kernel 35 is loaded to region B (Step S11). Thereafter as is well known, the AP loader in the kernel 35 loads the AP 371 to AP(n) 37n and the dll (API) 38 to region C having the privilege level of ring 3.

FIG. 4 is a functional block diagram showing one example of the monitoring software. The CPU 11 executes the monitoring software 31 loaded to the RAM 30. The monitoring software 31 includes an interrupt handler creation part 311 to create an interrupt handler 32, a hook condition monitoring part 312, and a Syscall instruction monitoring part 313 to monitor a Syscall instruction as well as a log processing part 314 and an environment monitoring part 315 that are included as needed, and these parts function as the processing execution parts of the CPU 11. The Syscall instruction monitoring part 313 may be executed separately from the hook condition monitoring part 312. The log processing part 314 and the environment monitoring part 315 may be executed separately from the hook condition monitoring part 312 and the Syscall instruction monitoring part 313.

The interrupt handler creation part 311 creates an interrupt handler 32, and the interrupt handler 32 is to execute a series of monitoring processing to each of the exceptions issued to accesses detected at the hook condition monitoring part 312 and at the Syscall instruction monitoring part 313.

The hook condition monitoring part 312 includes an access detection part 3121 and a hook condition correction part 3122 in the interrupt handler 32. The hook condition correction part 3122 is a program to monitor a hook condition.

The instruction to read and write the content of the MSR 12 is permitted at the privilege mode (ring 0). Meanwhile, since the present embodiment is configured so that the kernel 35 operates as ring 2, the access instruction (rdmsr, wrmsr) to the MSR 12 as the privilege instruction is a general protection fault of the CPU 11. The exception interrupt by the CPU 11 at this time is transferred to the interrupt handler 32 via the preconfigured IDT 342.

Then in response to the issuance of this general protection exception, the access detection part 3121 of the interrupt handler 32 refers to an instruction pointer EIP (execution address of the instruction where the exception occurs) that the CPU 11 pushes into the stack, and determines whether it is a wrmsr instruction or not. When it is determined that the access instruction is a wrmsr instruction, the access detection part 3121 determines whether the region to be written is the register 121 relating to the Syscall instruction in the MSR 12.

When the access detection part 3121 determines that the region to be written is the register 121 relating to Syscall, the hook condition correction part 3122 writes the Disable bit in the register 121 to be value 0. Thereafter in order to return the control to the kernel 35, the hook condition correction part 3122 adds the number of bytes of the wrmsr instruction to the EIP of the stack, and issues an iret instruction (when an interrupt is called, a flag (eflags) also is put on the stack, and therefore a dedicated return instruction iret is to be used). Thereby, the control is returned to the instruction following the wrmsr instruction of the kernel 35. For an unauthorized rewriting request (access) to the register 121, such hook-condition monitoring processing always corrects the value of the Disable bit to value 0 irrespective of whether the bit is rewritten or not, and so can keep the monitorable state of an exception described later. Instead, only when the value is rewritten to 1, the value may be corrected to 0.

Figure 5:
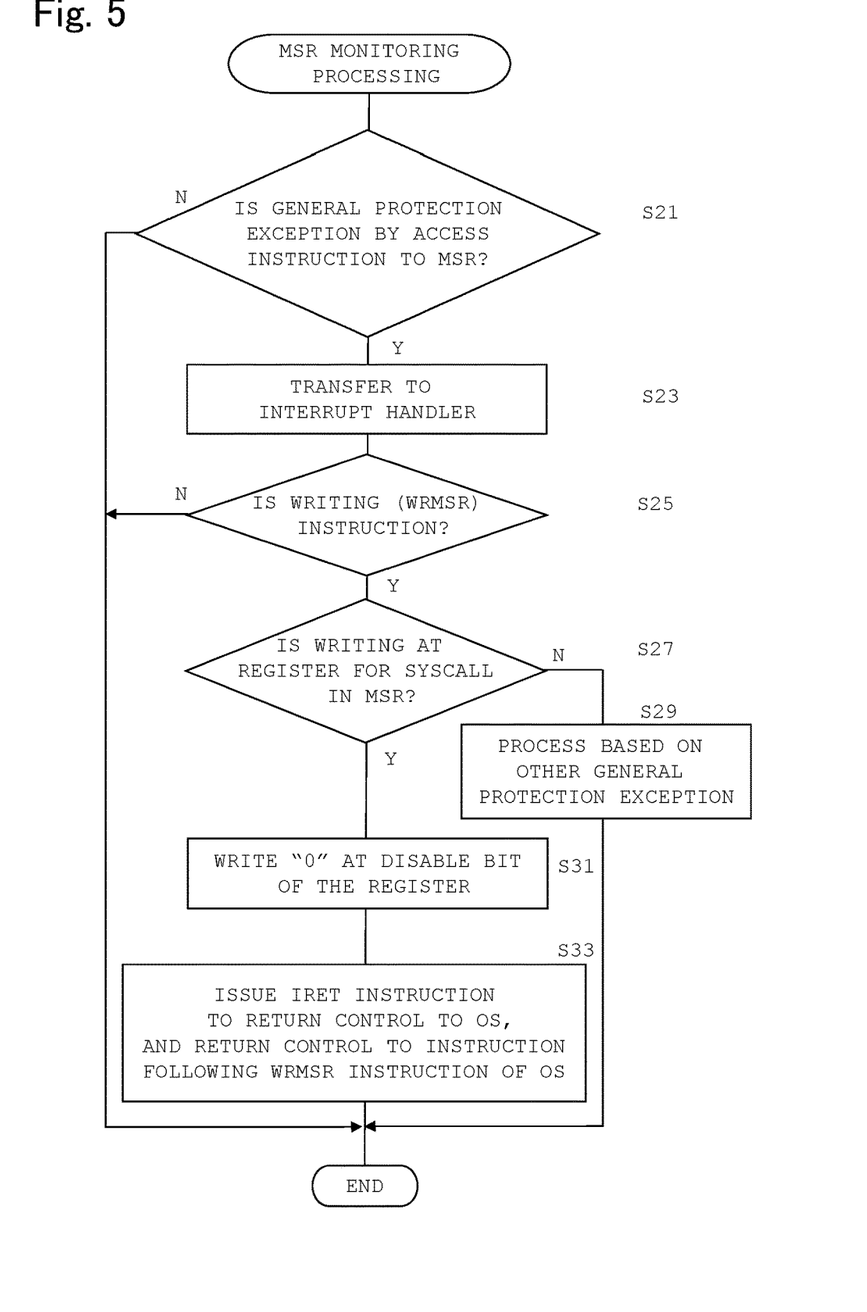
FIG. 5 is a flowchart showing one example of the MSR monitoring processing.

FIG. 5 is a flowchart showing one example of the MSR monitoring processing. In FIG. 5, Steps S21 and S23 are the steps for general protection exception, which are described in the flowchart for easy understanding. Firstly, a determination is made whether a general protection exception occurs or not by an access instruction to the MSR 12 (Step S21). When there is no general protection exception by an access instruction to the MSR 12, the procedure proceeds to the end of the flow, and when there is a general protection exception by an access instruction to the MSR 12, the processing is transferred to the interrupt handler 32 (Step S23).

Then the interrupt handler 32 checks the general protection exception as to whether it is a writing (wrmsr) instruction or not (Step S25). When the general protection exception is not a writing (wrmsr) instruction, the procedure leaves the flow. When the general protection exception is a writing (wrmsr) instruction, the following determination is made whether the region to be written is the register 121 relating to Syscall instruction in the MSR register 12 or not (Step S27). When it is not the register 121 relating to Syscall instruction, the processing corresponding to the general protection exception occurred is executed (Step S29). When it is the register 121 relating to Syscall instruction, value 0 is written at the Disable bit in the register 121 (Step S31). Next, an iret instruction is issued to return the control to the kernel 35, and the control is returned to the instruction following the (wrmsr) instruction of the kernel 35 (Step S33).

Referring back to FIG. 4, the Syscall instruction monitoring part 313 is a program to monitor a Syscall instruction in the interrupt handler 32, and includes a detection part 3131, a valid/invalid evaluation part 3132 and a proxy processing part 3133.

When the register 121 relating to Syscall instruction in the MSR 12 is Disable (=0), the CPU 11 generates an invalid opcode exception in response to the issuance of a Syscall instruction. That is, in the present embodiment, an access at ring 0 that issues a processing request for a resource, a Syscall instruction in this case, is set as an invalid opcode fault. An invalid opcode fault refers to the case where a valid computer instruction is not present or the processor tries to execute an instruction including an invalid operand, for example. Restoring is not possible from an invalid opcode fault depending on the types of the fault, that is, restarting or shutdown of the system has to be performed. Since access means for a processing request to a resource is a Syscall instruction, the present embodiment uniformly sets a Syscall instruction as a hooking target that is an invalid opcode fault because there is a possibility that a malicious program is involved (is hidden) in the Syscall instruction.

When the processing is transferred to the interrupt handler 32 because the exception interrupt is generated by the CPU 11, the detection part 3131 as the interrupt handler 32 refers to an instruction pointer EIP (execution address of the instruction where the exception occurs) that is stored (pushed) in the stack, and determines whether the access is a Syscall instruction or not.

When the access is a Syscall instruction, the valid/invalid evaluation part 3132 as the interrupt handler 32 evaluates whether the calling function of the kernel 35 and its parameter are valid or not as follows based on the contents at this time in the registers such as eax, ebx, ecx and edx in the general-purpose register 13 and in the stack in which the immediately preceding processing is saved and stored (e.g., codes of the Syscall instruction).

The valid/invalid evaluation part 3132 evaluates whether the calling function of the kernel 35 and its parameter are valid or not using the preconfigured reference information part 33 in region A by collating, for example. The reference information part 33 contains candidates that are likely invalid among the codes of API making up a Syscall instruction. Such API candidates that are likely invalid include (a) currently not-use or not-public API, (b) reading/writing to a file under C:¥WINDOWS (registered trademark) or C:¥ProgramFiles (tampering or newly creation), and (c) changing of right (Token) given from the kernel 35 (e.g., upgrade request from user right to administrative right). The reference information part 33 may contain the information on about the AP(1) 371 to AP (n) 37n by referring to PCR (Processor Control Region) describing about the thread or the process, as to (a) whether the AP is permitted in operation (e.g., whether the AP has a path (folder) whose installation is permitted), and (b) whether the folder in which data is to be written is permitted in writing.

It may further contain the information (c) to distinguish the API about through which process (application program) the API is issued, e.g., whether a process that never performs communication issues an API of communication, and (d) whether the process issuing the API of communication is a process created through the process manipulated by a human. This enables the distinguishing about whether the process is based on the manipulation by a human using the input part 40 or based on a program (typically a malicious program).

When Syscall instruction is evaluated as valid, the proxy processing part 3133 as the interrupt handler 32 transfers the control to the kernel 35. When Syscall instruction is evaluated as invalid, the proxy processing part 3133 disables the Syscall instruction evaluated as invalid, and then returns the following instruction to the AP that issues this Syscall instruction or makes the kernel 35 perform the ending function of the program.

When control is transferred to the kernel 35, the EIP of the stack is rewritten as the entry point of the kernel 35, whereby the content in the stack can be returned to the kernel 35 set at ring 2. The kernel 35 set at ring 2 executes the content created by the proxy processing part 3133 as the supervisor (at the kernel mode). When control is transferred for returning to the application, the number of bytes of the Syscall instruction is added, and an iret instruction is issued.

Figure 6:
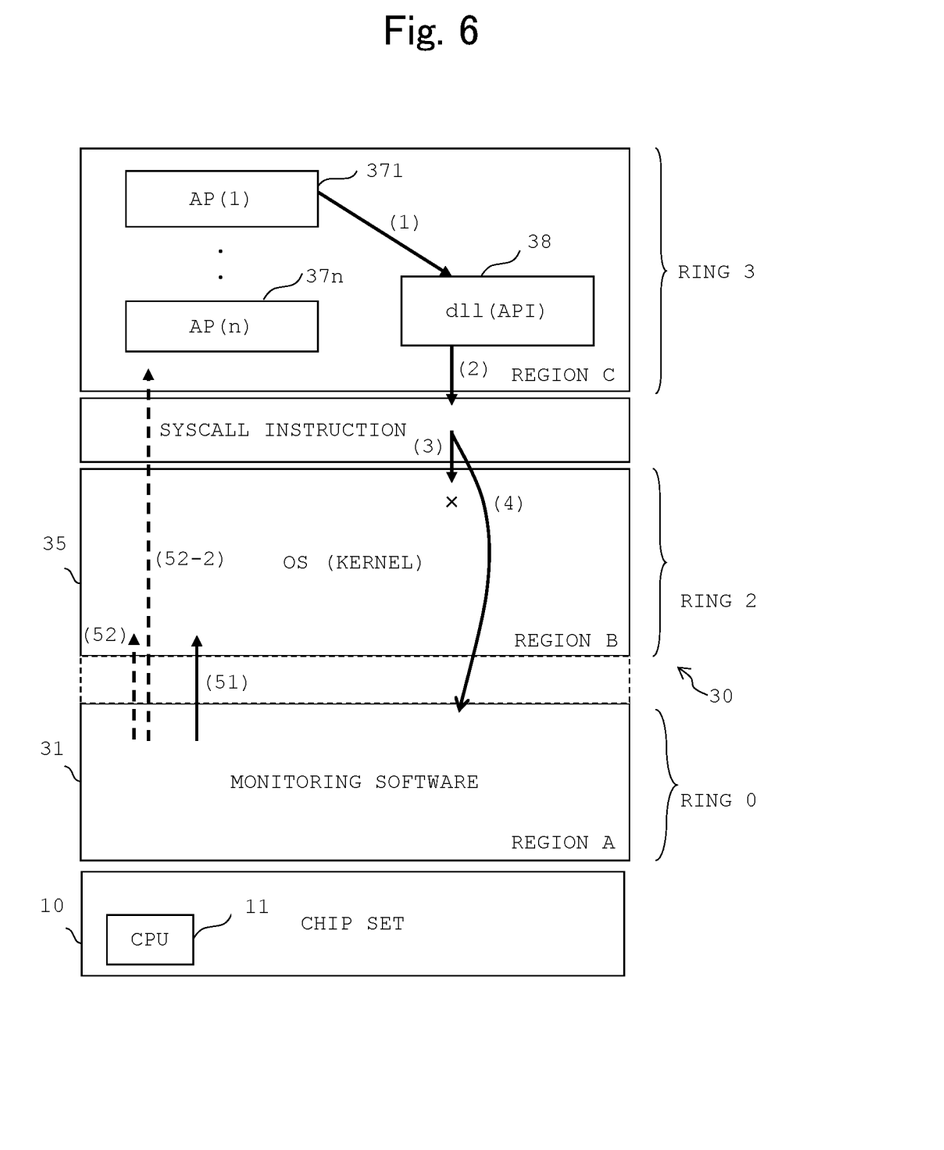
FIG. 6 explains the procedure of the monitoring processing.

As shown in FIG. 6, when the AP(1) 371, for example, issues a processing request for a predetermined resource during the operation of the information processing device 1, the AP(1) 371 accesses the dll (API) 38 (see Step (1) in FIG. 6) to configure the API and create a Syscall instruction (see Step (2) in FIG. 6). Next, the Syscall instruction accesses the kernel 35 at ring 0 (see Step (3) in FIG. 6). At this time, an invalid opcode fault is issued to the Syscall instruction, and this invalid opcode fault is hooked by the monitoring software 31 (see Step (4) in FIG. 6).

Instructions other than the Syscall instruction may be a target of the invalid opcode fault. Therefore, the instruction that issued the invalid opcode fault is analyzed. That is, whereas a Syscall instruction is disabled, the proxy processing part 3133 performs the processing based on the evaluation result whether the instruction is valid/invalid (validity) (see Steps (51), (52) in FIG. 6).

Specifically when the evaluation result is valid, the proxy processing part 3133 performs proxy processing to transfer the control to the kernel 35 (see Step (51) in FIG. 6). The proxy processing part 3133 issues, as the instruction to the kernel 35 for controlling, the content identical with the content of the Syscall instruction that is disabled as the invalid opcode fault.

On the contrary, when the evaluation result is invalid, the proxy processing part 3133 transfers the control to the kernel 35 (see Step (52) in FIG. 6) or returns the following instruction of the Syscall instruction to the AP that issued the instruction (see Step (52-2) in FIG. 6). The processing to transfer the control to the kernel 35 is performed similarly in the case of valid. Herein the Syscall instruction created by the proxy processing part 3133 is to instruct force-quit of the program, i.e., returning without performing any processing. The processing to return the following instruction of the Syscall instruction to the AP that issued the instruction is to add the number of bytes of the Syscall instruction so as to return the control to the following instruction in a similar manner to the skipping of the Syscall instruction.

Figure 7:
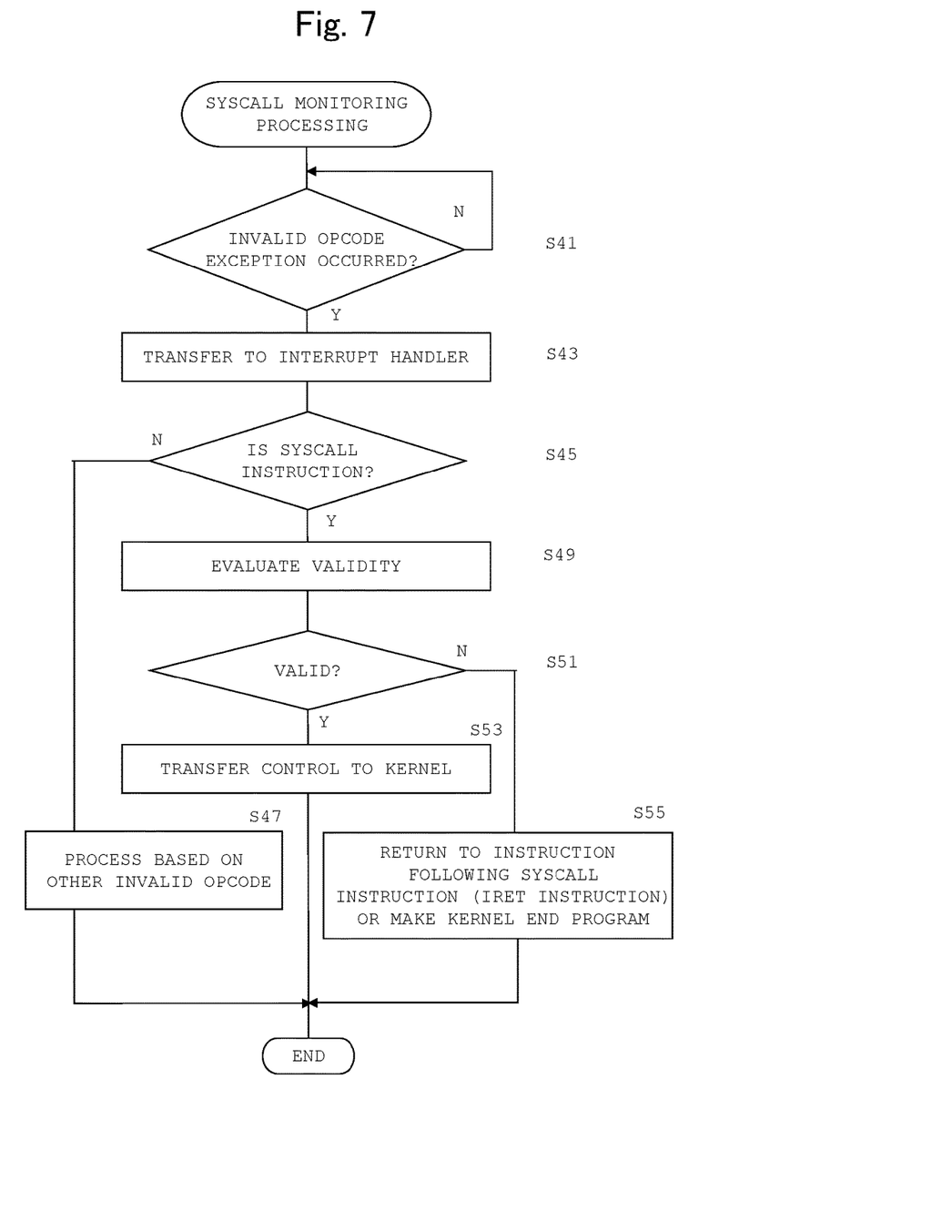
FIG. 7 is a flowchart showing one example of the Syscall monitoring processing.

FIG. 7 is a flowchart showing one example of the Syscall monitoring processing. In FIG. 7, Steps S41 and S43 are the steps for invalid opcode exception, which are described in the flowchart for easy understanding. Firstly in FIG. 7, a determination is made whether an invalid opcode exception occurs or not (Step S41). When an invalid opcode exception occurs, the control is transferred to the interrupt handler 32 (Step S43).

The interrupt handler 32 analyzes whether the instruction to issue the invalid opcode exception is a Syscall instruction or not (Step S45). When it is not a Syscall instruction, the processing corresponding to another invalid opcode is executed in accordance with the instruction (Step S47). When it is a Syscall instruction, its validity is evaluated (Step S49). When the evaluation results in valid (Yes at Step S51), the control is transferred to the kernel 35 (Step S53). When the evaluation results in invalid (No at Step S51), the processing to return the following instruction of the Syscall instruction to the AP that issued the instruction (iret) or the processing to make the kernel 35 perform the ending function of the program is performed (Step S53). Therefore, the monitoring software 31 can protect resource (hardware resource) and can monitor the operation of the kernel 35 and the APs real time, and so intrusion by a malicious program from the outside or the leakage of information to the outside can be prevented effectively.

The log processing part 314 stores all of the contents of the programs in the access agreeing with the reference information part 33 or evaluated as invalid in the log memory part 60 chronologically. Preferably the log processing part 314 stores the contents together with time information on when they occurred. When the log memory part 60 is a data server device via a network such as the internet, the log processing part 314 adds the source IP addresses for storing them. When the log memory part 60 is an external data server device, the contents may be sorted by their IP addresses, whereby the logs can be managed for each information processing device. The log information may include a Syscall instruction as the invalid opcode fault at least. According to the present embodiment, the contents saved in the log memory part 60 are analyzed later, whereby secure and appropriate analysis is enabled after any abnormal operations or processing. The analysis can be a lesson for the future, which can reduce unauthorized accesses.

Information to be logged in the present embodiment includes at least one or all of the process list, the file I/O logs, the network transmission/reception logs, the environmental setting value access logs, and the monitoring and logging contents. For the process list, executed programs are managed by the OS as the process and are stored in the PCR. A process executed always involves the exchanging with the kernel 35 via Syscall, and so the list of the process executed can be acquired. Acquired information includes the name of a program file and its path, the process ID, and the starting time, for example. Such information acquired clarifies whether an unknown or unnecessary program is executed or not. Another determination can be made whether the program is abnormal or not from the acquired information.

For the file I/O logs, they are acquired by acquiring a request for file I/O from the API function number (register eax) at the time of Syscall. The file I/O logs are acquired from its parameter value (the contents of the general-purpose register 13 or the data in the stack) as the file path or the operation (reading/writing). Acquired information includes the file path, the operation method (writing or reading) and the process ID. Such information acquired clarifies whether unauthorized access is performed or not based on the writing on the program file or the operation of a specific folder designated by a user.

When the network transmission/reception logs are acquired, a transmission/reception request is acquired from the API function number (register eax) at the time of Syscall and Sysret. Then, the network transmission/reception logs are acquired from its parameter value (the contents of the general-purpose register 13 or the data in the stack) as the transmitted/received data and the operation (connect, send, receive, accept). Acquired information includes the operation method (connect, send, receive, accept), the transmitted/received data, the transmission/reception port, and the transmission/reception IP address (IPV4 and IPV6). Such information acquired allows monitoring of the transmission/reception operation that is the basis of information leakage. An unauthorized access also can be tracked based on the designation IP address and the source IP address. Such information acquired enables protection as well based on the analysis of the transmitted/received data.

An access to the environmental setting values is monitored because an unauthorized manipulation from the kernel mode is not performed via a Syscall instruction. The environmental setting value access logs are acquired as the content of the monitoring. Acquired information includes an access to the MSR 12 and the content, an access to a control register (CR0, CR2, CR4) and the content, an access to a debug register and the content, the execution of a cache control instruction, the execution of a CPUID instruction, an access to a page table PML 4, the execution of a software interrupt instruction, an access to a CPU system table (GDT, IDT, LDT, TSS) and a load instruction, an execution EIP and its module name (kernel program and kernel driver), and an interrupt to a not-used interruption vector and an interrupt destination execution code.

The monitoring and logging contents include an access to the physical address of 1 Mbyte or lower. This region is not used after starting of the OS, and therefore such an access can be an unauthorized use. An access to a physical address ACPI managing table can be an unauthorized acquisition of terminal information. Configuration of a device access (MMIO) physical address for all page tables by a direct access from a device from other than the kernel can be determined as an unauthorized access. Forging of a kernel program can be checked by a comparison in the kernel program region.

Figure 8:
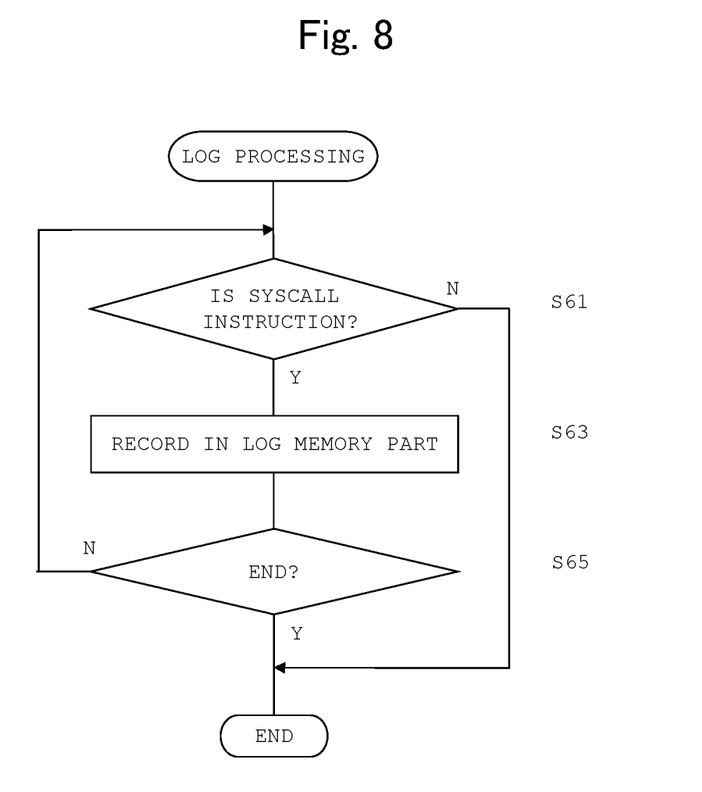
FIG. 8 is a flowchart showing one example of the log processing.

FIG. 8 is a flowchart showing one example of the log processing. Firstly, a determination is made whether a Syscall instruction is hooked or not (Step S61). When it is not hooked, the procedure leaves the flow. When it is hooked, the Syscall instruction is recorded in the log memory part 60 (Step S63). Such processing is continued to shutdown (Yes at Step S65). Herein a Syscall instruction is a log target, and the same applies to the case where a certain cause for hooking, e.g., an instruction corresponding to an invalid opcode fault, for example, is a log target.

During the operation of the CPU 11, the content of a specific register or the like in the MSR 12 or other registers may be rewritten by a malicious program. The environment monitoring part 315 has a function of, when an access to write in such a specific register or the like is issued, hooking the access. The specific register or the like is a register in which fundamental environmental setting values, which are required for the operation of the CPU 11, are configured. The fundamental environmental setting values include those described below. The environment monitoring part 315 hooks an access to a specific register or the like, in which these environmental setting values are configured, especially a writing access, as a general protection exception or an invalid opcode fault, and blocks this access (disable, inhibit, restore). Then the environment monitoring part 315 returns this to the following instruction. Alternatively the environment monitoring part 315 may perform processing to rewrite it to be the original content irrespective of the content being rewritten or not before returning.

As the fundamental environmental setting values, there is a plurality of types of values as follows. They include the environmental setting values of the OS (kernel) representative of process control information (PCR, PRCB, ETHREAD, EPROCESS or the like of Windows (registered trademark) OS). An access to these setting values has to be made by requesting it from the kernel via the API. Then, the process needs administrative privilege (this is the privilege of the CPU 11, different from the ring as stated above) managed by the OS, and therefore the privilege of individual processes is monitored. Other fundamental environmental setting values include the environmental setting values of the CPU and the environmental setting values of the MSR stored in a control register (CR0, CR4, CR3), a debug register (DR0 to DR7), a MSR (such as IA32E_EFER) as well as GDTR, IDTR, and LDTR. Monitoring is performed for an access to these values while setting at ring 2. Other fundamental environmental setting values include the environmental setting values of the API to monitor a parameter value or data immediately before requesting from the kernel and immediately after returning from the kernel. For the monitoring, the validity is determined while considering the combination with the "environmental setting values of the OS" as well. An example of the monitoring of a parameter includes the case whether writing in a designated file path (c:¥windows¥system32¥ntoskrnl.exe) is requested or not. An example of the monitoring of data includes the case whether the transmission/reception buffer contains binaries or not. Other fundamental environmental setting values include the environmental setting values of the ACPI (Advanced Configuration and Power Interface) to specify the power-supply control of a computer and the hardware components. In order to make it hard for the kernel 35 of the OS to figure out the physical memory map configured by the monitoring software 31, information on the physical memory is changed when the kernel 35 accesses such information. Other fundamental environmental setting values include the environmental setting values of a BIOS jump instruction that the OS uses a BIOS Function using a software interrupt in the real mode. In order to prevent the forging or an unauthorized use of this BIOS Function, interruption vector in the real mode is hooked. Other fundamental environmental setting values include the environmental setting values of Kernel Driver. When an attempt is made to change the "environmental setting values of the CPU 11" using a driver, the instruction is ignored and unloading is performed. Further, loading of the driver from an application is prohibited.

The present embodiment is configured so that a Syscall instruction is hooked as an invalid opcode fault, and the fault is not limited to such an invalid opcode fault. The Syscall instruction may be hooked based on other exceptions.

As described above, an information processing device of the present invention includes a monitoring unit configured to monitor at least an instruction to pass processing to a kernel of an OS among instructions issued to a processor; and a load unit configured to load a monitoring software functioning as the monitoring unit at a predetermined region of a main memory, the monitoring software having a privilege level set higher than a privilege level of the kernel of the OS. The present invention is used for an information-processing monitoring method, a program, and a recording medium.

According to the present invention, since the monitoring software has a privilege level set higher than the privilege level (ring) of the kernel of the OS, at least the issuance of the instruction to pass processing to the kernel of the OS among instructions issued to the processor can be always monitored so as to hook the issuance. Therefore, even when such an instruction contains an invalid program and an access is tried to a resource by executing such a malicious program, the access can be detected and intrusion of the malicious program to the kernel can be blocked.

The monitoring unit includes: a detection unit configured to detect issuance of at least an instruction to pass processing to the kernel of the OS among instructions issued to the processor; an evaluation unit configured to evaluate validity of the instruction detected; and a proxy processing unit configured to execute the instruction by proxy in accordance with an evaluation result. With this configuration, an instruction detected by the detection unit is evaluated in validity by the evaluation unit. The evaluation is performed by a method relating to the possibility of a malicious program. Then, the proxy processing unit issues an instruction in accordance with a result of the evaluation. The evaluation result assumed includes valid and invalid, and in any case, the proxy processing unit newly issues an instruction, and the original instruction from the issuer is not used as it is. This can block the intrusion into a resource by a malicious program via the kernel as well as the hiding of the malicious program.

The detection unit preferably detects the instruction as an invalid opcode fault. This configuration enables reliable detection of the access instruction causing a problem.

Preferably the instruction is a Syscall instruction, and the evaluation unit evaluates validity based on collation with information on an API making up the Syscall instruction. With this configuration, the detection focuses on a Syscall instruction that enables an access from an application program to a resource, and validity is evaluated by collation with information on the API (Application Programming Interface) making up the Syscall, e.g., the attributes, the stored location, and the source. Thereby, the evaluation on malicious programs can be made correctly.

Preferably the proxy processing unit is configured to, when the evaluation unit determines that the instruction is valid, transfer content identical with the instruction to the kernel, and when the evaluation unit determines that the instruction is invalid, return an instruction to end the instruction to the kernel. With this configuration, in any case of the valid and invalid access instructions, the proxy processing unit newly issues an instruction, and therefore infection from the malicious program can be reduced.

Preferably the proxy processing unit is configured to, when the evaluation unit determines that the instruction is valid, transfer content identical with the instruction to the kernel, and when the evaluation unit determines that the instruction is invalid, return an instruction to skip the instruction to the kernel. With this configuration, in any case of the valid and invalid access instructions, the proxy processing unit newly issues an instruction, and therefore infection from the malicious program can be reduced.

The monitoring unit preferably includes a hook condition setting unit to set a hook condition for monitoring. The monitoring unit preferably is configured to detect issuance of at least an instruction to pass processing to the kernel of the OS among instructions issued to the processor based on the hook condition set by the hook condition setting unit. With this configuration, the monitoring unit detects issuance of an instruction to pass processing to the kernel of the OS based on the hook condition set by the hook condition setting unit.

Preferably the hook condition setting unit includes: a hook condition monitoring unit configured to monitor an access to rewrite the hook condition; and a hook condition correction unit configured to rewrite the hook condition every time issuance of an access to rewrite the hook condition is detected. With this configuration, the hook condition monitoring unit monitors an access to rewrite the hook condition, and the hook condition correction unit rewrites the hook condition correctly every time issuance of an access to rewrite the hook condition is detected.

The load unit preferably includes: a first load unit configured to perform loading of a monitoring software functioning as the monitoring unit; and a second load unit included in the monitoring software loaded by the first load unit, the second load unit being configured to perform loading of the kernel of the OS. With this configuration, the second load unit that is included in the monitoring software loaded by the first load unit configured to perform loading of the monitoring software performs loading of the kernel of the OS. The kernel of the OS therefore has a lower privilege level.

Preferably the first load unit is configured to load the monitoring software functioning as the monitoring unit at privilege level 0, and the second load unit is configured to load the kernel of the OS at any one of privilege levels 1 and 2. With this configuration, the monitoring software has the highest privilege level, and therefore the monitoring software can monitor the behavior of the kernel of the OS at privilege level 1 or 2 that can be operated at the kernel mode.

REFERENCE SIGNS LIST

1 Information processing device
11 CPU (processor)
121 Register relating to Syscall instruction
201 Exclusive loader (load unit)
30 RAM (main memory)
31 Monitoring software (monitoring unit)
32 Interrupt handler
33 Reference information part
35 Kernel
38 D11 (API)
312 Hook condition monitoring part (hook condition setting unit)
3121 Access detection part (hook condition monitoring unit)
3122 Hook condition correction part (hook condition correction unit)
313 Syscall instruction monitoring part (monitoring unit)
3131 Detection part (detection unit)
3132 Valid/invalid evaluation part (evaluation unit)
3133 Proxy processing part (proxy processing unit)

The invention claimed is:

1. An information processing device that blocks intrusion of a malicious program to a kernel, the information processing device comprising:
   a main memory configured to store a monitoring software, the monitoring software having a privilege level set higher than a privilege level of a kernel of an OS;
   a loader configured to load the monitoring software at a predetermined region of the main memory during starting after loading BIOS;

a secondary loader included in the monitoring software loaded by the loader, the secondary loader being configured to load the kernel of the OS after loading the monitoring software; and a processor configured to communicate with the main memory and perform operation based on the monitoring software, wherein:

the processor monitors at least a Syscall instruction to pass processing to the kernel of the OS among instructions issued to the processor, and monitors, as a privilege level fault, an access to request for rewriting a Disable bit to which a hook condition for hooking issuance of the Syscall instruction is set, the Disable bit being one register in a Model Specific Register in a chip set, and prevents rewriting; and the processor is configured to set the hook condition to the Disable bit of the one register by detecting an access to request for rewriting the hook condition as a general protection exception fault by an interrupt handler and correcting the hook condition with respect to the Disable bit of the one register every time issuance of the access to request for rewriting is detected as the general protection exception fault.

2. The information processing device that blocks intrusion of a malicious program to a kernel according to claim 1, wherein the processor monitoring module includes the interrupt handler; and the interrupt handler includes is:

a detection module configured to hook the issuance of the Syscall instruction as an invalid opcode fault by using the hook condition;

an evaluation module configured to evaluate validity of the Syscall instruction that has been detected; and configured to execute the Syscall instruction by proxy in accordance with an evaluation result.

3. The information processing device that blocks intrusion of a malicious program to a kernel according to claim 1, wherein the interrupt handler collates information on an API making up the Syscall instruction and evaluates validity based on a collation result.

4. The information processing device that blocks intrusion of a malicious program to a kernel according to claim 1, wherein the interrupt handler is configured to, when the Syscall instruction is valid, transfer content identical with the Syscall instruction to the kernel, and, when the Syscall instruction is invalid, return an instruction to end the Syscall instruction to the kernel.

5. The information processing device that blocks intrusion of a malicious program to a kernel according to claim 1, wherein the interrupt handler is configured to, when the Syscall instruction is valid, transfer content identical with the Syscall instruction to the kernel, and, when the Syscall instruction is invalid, return an instruction to skip the Syscall instruction to the kernel.

6. The information processing device that blocks intrusion of a malicious program to a kernel according to claim 1, wherein the loader is configured to load the monitoring software at privilege level 0; and the secondary loader is configured to load the kernel of the OS at any one of privilege levels 1 and 2.

7. A method of processing information, the method blocking intrusion of a malicious program to a kernel, the method comprising:

loading a monitoring software at a predetermined region of a main memory of a processor after loading BIOS, the monitoring software having a privilege level set higher than a privilege level of a kernel of an OS, the monitoring software then loading the kernel of the OS; and causing the processor to perform monitoring operations by the monitoring software including:

monitoring at least a Syscall instruction to pass processing to the kernel of the OS among instructions issued to the processor, and monitoring, as a privilege level fault, an access to request for rewriting a Disable bit of one register in a Model Specific Register to which a hook condition for hooking issuance of the Syscall instruction is set, the Model Specific Register being in a chip set, and prevents rewriting; and setting the hook condition to the Disable bit of the one register by detecting an access to request for rewriting the hook condition as a general protection exception fault by an interrupt handler and correcting the hook condition with respect to the Disable bit of the one register every time issuance of the access to request for rewriting is detected as the general protection exception fault.

* * * * *